TAPE COMPARATOR

Filed Nov. 2, 1955 2 Sheets-Sheet 1

INVENTORS.
JAMES E. BELLINGER
JOHN H. MacNEILL
BY James S. Shannon
AGENT—
and
Wade Koontz
ATTORNEY April 29, 1958 J. E. BELLINGER ET AL 2,832,412

TAPE COMPARATOR

Filed Nov. 2, 1955 2 Sheets-Sheet 2

INVENTORS.
JAMES E. BELLINGER
JOHN H MACNEILL
BY James S. Shannon
AGENT and
Wade Koontz
ATTORNEY 2,832,412

TAPE COMPARATOR

James E. Bellinger, Eau Gallie, and John H. MacNeill, Melbourne, Fla.

Application November 2, 1955, Serial No. 544,618

10 Claims. (Cl. 164—112)

Figure 1:
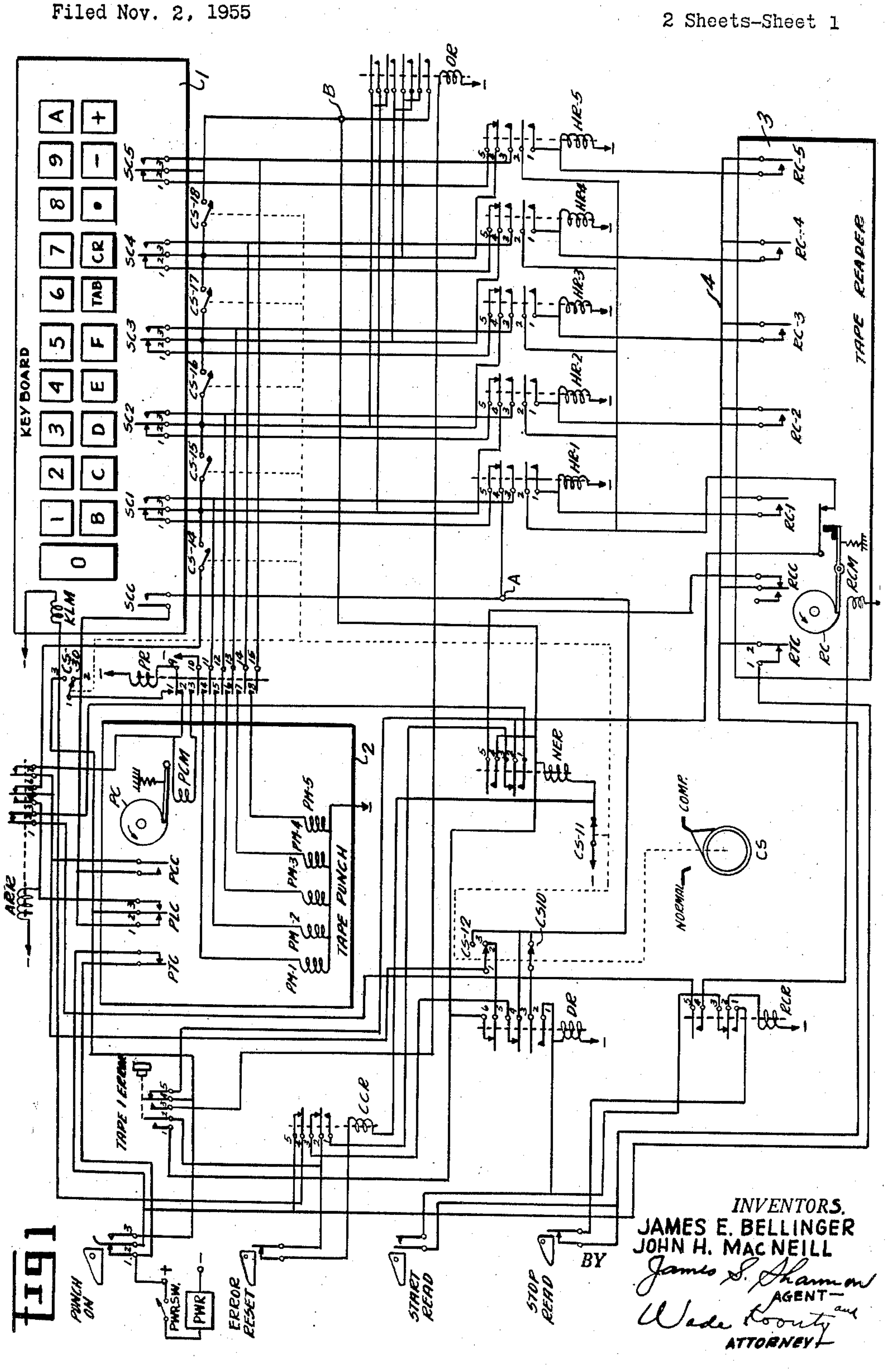

(Granted under Title 35, U. S. Code (1952), sec. 266)

The invention described herein may be manufactured and used by or for the Government for governmental purposes without payment to us of any royalty thereon.

This invention relates to the recording of information on tape in binary code and has as its object the provision of apparatus for producing a tape record in which the probability of error is practically zero.

The apparatus comprises essentially a keyboard having a binary coded electrical output, a tape recorder actuatable by the coded output of the keyboard, a tape reader having a binary coded electrical output, and the necessary interconnecting control circuits for these elements. In operation, a first tape record is prepared by a first operator. This tape record may be prepared with the described apparatus using the keyboard and tape recorder thereof in conventional manner, or it may be prepared on an entirely separate tape recording apparatus. The first tape is then placed in the tape reader. The reader senses the first code group of the tape, which is then stored in a memory circuit, and brings the next code group into reading position. A second operator, reading from the original manuscript, then depresses the key of the keyboard corresponding to the first character of the manuscript. If the resulting coded output of the keyboard corresponds to the stored output of the reader, the tape recorder is actuated to record this code group on a second tape and the reader proceeds to clear the memory circuit and read the code group then in reading position, this group being likewise stored in the memory circuit. If, however, the coded output of the keyboard does not correspond to the stored reader output, the recorder and reader are not actuated and the keyboard is locked against further operation, indicating an error. If it is found that the error was made by the second operator the keyboard is released by a manually operated switch and the proper key depressed. Since the keyboard output will then agree with the stored reader output, the recorder and reader will be actuated as described above. If the error is found to be in the first tape, another manually operated switch is provided to override the comparison circuit and permit direct operation of the reader from the keyboard while the switch is actuated, thus permitting the proper code group to be recorded on the second tape. Release of the latter switch permits the reader to be actuated for sensing and storing the next code group and so on.

In the above manner the second operator goes through the entire manuscript character by character. Since it is very unlikely that two different operators would make mistakes on the same characters of the manuscript, the possibility of an error in the second tape is remote.

The described tape comparator may be constructed as a separate unit for performing the functions of tape recording and comparing only, or it may be incorporated in conventional commercially available recorder-reproducer machines utilizing the keyboard and associated selector contacts, the tape reader and the tape recorder of the commercial machine in performing the tape comparator function. In such cases a suitable selector switch is provided so that the tape comparator may be switched into or out of use at will.

Figure 2:
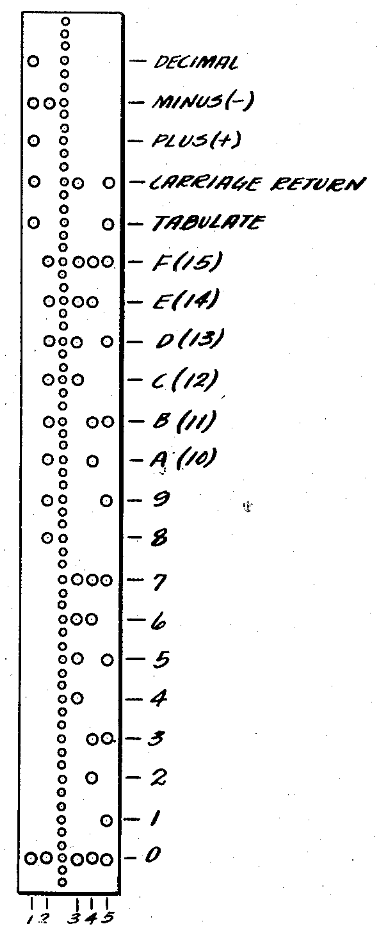
Figure 3:
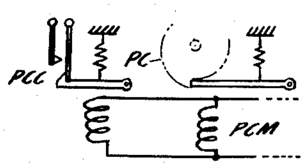

A specific embodiment of the apparatus is shown in the accompanying drawings, in which Fig. 1 is a schematic circuit diagram of the tape comparator;

Fig. 2 illustrates the type of tape record utilized with the apparatus of Fig. 1; and Fig. 3 shows an alternative method of actuating the punch common contact.

Although the embodiment of Fig. 1 is designed for use with perforated tape, the principles involved are applicable to other methods of tape recording such, for example, as magnetic recording.

Referring to Fig. 1, the major elements of the tape comparator are the keyboard 1, the tape recorder or punch 2 and the tape reader 3. The punch is conventional, however, the keyboard and the reader are modified from their usual forms to certain extents as will be explained later. Since the mechanical designs of these elements are well known in the art and adequately described in the literature on the subject, they will be described here only in sufficient detail to permit an understanding of the comparator circuit.

A simple keyboard having twenty-one keys and producing a five-unit binary code is shown, however, the number of keys and the number of units in the code are immaterial. A keyboard of this type may be used to record numbers in binary coded decimal form or in binary form from hexadecimal notation for insertion into high speed automatic digital computers. The keyboard contains five selector contacts SC1–SC5, one for each code unit, and a common contact SCC. Depression of any key operates one or more of SC1–SC5 and SCC. The code used is shown in Fig. 2 wherein the numbers of the rows correspond to the numbers of the selector switches in the keyboard. For example, depression of the 5 key operates SC3 and SC5 and results in perforations in rows 3 and 5 of the tape. The back contacts of SC1–SC5 are unconventional and were added for use in the comparator circuit. The keyboard also contains a locking mechanism which is controlled by keyboard lock magnet KLM. The arrangement is such that when KLM is deenergized operation of the keyboard is prevented. Mechanisms for accomplishing this function are well known in the electric typewriter art.

Referring to tape punch 2, only the electrical details of the punch are shown since, as stated above, the mechanical details of such punches are well known. Briefly, however, the complete punch apparatus contains five punches, one for each code unit, which are controlled by the five punch magnets PM1–PM5. Each punch is actuated by a mechanism which is normally latched in an inoperative condition by the armature of the associated punch magnet. The punch actuating mechanisms are operated by cams on a shaft which is driven at the proper time from a constant speed power shaft through punch clutch PC, one complete rotation of the cam shaft constituting one complete cycle of the punch. The punch clutch is normally held in a disengaged condition by a latch mechanism controlled by punch clutch magnet PCM. PCM is energized for considerably less time than one punch cycle period and therefore permits the clutch to operate through one complete cycle only each time it is energized. The punch magnets and the punch clutch magnet are energized simultaneously, however, because of the slower action of PCM the punch actuating mechanisms are unlatched to an operative condition prior to release of the clutch latching mechanism. Later in the punch cycle the unlatched punch actuating mechanisms are returned to their normal latched inoperative conditions.

The punch 2 also contains several electrical contacts. Punch common contact PCC is actuated whenever one or more of punch magnets PM1–PM5 are actuated, and is returned to its normal open condition later in the cycle when the punch actuating mechanisms are returned to their latched conditions. PCC in effect shunts selector common contact SCC and operates to insure a complete operation of the punch should SCC open before the slower acting PCM has had time to unlatch the clutch, as will be explained later. Punch lock contact PLC is actuated shortly after the start of the punch cycle and returns to its normal condition near the end of the cycle. Its function is to bring into action an antirepeat circuit to prevent a repeat action of the punch should SCC remain closed beyond the end of the punch cycle, as will be explained later. Punch tape contact PTC is closed whenever tape is in operating position in the punch.

Tape reader 3 has five reader contacts RC1–RC5 which are associated with five feeler pins for sensing the presence of code perforations in the tape. The reader operates one cycle at a time through the agency of reader clutch RC controlled by reader clutch magnet RCM. The clutch, when actuated, couples the reader to a constant speed power shaft as in the case of the tape punch. RCM is energized for considerably less time than the reader cycle period so that only one cycle of operation occurs for each energization of RCM. At the beginning of the reader cycle the feeler pins are allowed to move upward toward the tape. If there is no code hole above a feeler pin the tape will prevent any further upward movement of the pin and prevent actuation of the associated reader contact. If there is a perforation in the tape above a feeler pin that pin will be allowed to move upward through the hole and this greater upward movement permits its associated reader contact to be actuated. Since the feeler pin and contact actuating mechanism is conventional and well known in the art it is not shown in the drawing for simplicity. Reader common contact RCC does not sense the tape and operates each reader cycle. It is designed to open before the reader contacts close. Reader tape contact RTC is closed whenever tape is in operating position in the reader. The principal differences between tape reader 3 and a conventional tape reader are the addition of the clutch and the provision of a breaking rather than a making contact at RCC. RCM is also provided with a breaking contact the purpose of which will be apparent later.

Considering Fig. 1 now in its entirety, the specific tape comparator circuit shown is designed for production of both the first and second tapes. When comparator switch CS is in its Normal position the keyboard 1 and punch 3 are connected in conventional manner for preparation of the first tape by the first operator. When CS is in its Comp. position the keyboard, punch and tape reader are interconnected for preparation of the final tape from a comparison of the first tape with the operation of the keyboard by the second operator. The operation of Fig. 1, beginning with the preparation of the first tape, is as follows:

With CS in its Normal position, tape in operating position in punch 3, PWR SW closed, and Punch On switch actuated, keyboard lock magnet KLM is energized through a circuit extending from (+) through PTC, contacts 5—4 of check control relay CCR, KLM to (−), unlocking the keyboard. Depression of any key of the keyboard will then actuate punch 3 to perforate the tape with the corresponding code. For example, assume that key 5 is depressed. The selector contacts are so designed that code contacts CS1–CS5 close before common contact SCC closes. Therefore, when key 5 is depressed contacts SC3 and SC5 are actuated and slightly later SCC closes. Closure of SCC energizes punch relay PR which in turn simultaneously energizes PM3, PM5 and PCM. The circuits may be traced as follows: When SCC closes, + voltage is applied from terminal 3 of Punch On through contacts 2—1 of PLC, SCC, contacts 3—1 of CS12, contacts 6—7 of antirepeat relay ARR, and contacts 2—9 of PR to the coil of PR. Positive (+) voltage is also applied from contact 6 of ARR to the upper terminal of PCM and from contact 5 of ARR through CS14, CS15, CS16 and contacts 2—3 of SC3 to contact 13 of PR and, similarly, through CS17, CS18 and contacts 2—3 of SC5 to contact 15 of PR. Energization of PR, therefore, causes PCM to be energized through PR contacts 3—10, and PM3 and PM5 to be energized through PR contacts 13—6 and 15—8, respectively. Although these energizations occur simultaneously, the inherently slower operation of the clutch release mechanism permits unlatching of the punch actuating mechanisms by PM3 and PM5 before the punch clutch engages. Energization of one or more of punch magnets PM1–PM5 closes punch common contact PCC which applies + voltage at contact 1 of PLC through contacts 6—7 of ARR to PCM. Since PLC does not actuate until after the start of the punch cycle, PCC insures operation of the clutch should SCC not remain closed long enough for release of the punch clutch to take place. Once energized, PR is held energized through its contacts 1—9 and contacts 1—3 of CS30 to + voltage at contact 3 of Punch On.

Actuation of PLC shortly after the start of the punch cycle energizes antirepeat relay ARR through PLC contacts 2—3. Actuation of ARR breaks the circuit to SC1—SC5 at contacts 4—5 and breaks the energization circuit of PCM at contacts 6—7. A holding circuit including SCC is provided for ARR and may be traced from contacts 3—4 of ARR through contacts 1—3 of CS12, SCC, contacts 1—2 of PLC and thence to (+) through Punch On 3—2 and PTC. When PLC returns to its normal condition at the end of the punch cycle contacts 1—2 close and contacts 2—3 open. If SCC is open at the end of the punch cycle the above described holding circuit is open and the breaking of contacts 2—3 of PLC deenergizes ARR. However, if SCC has not opened by the end of the cycle the energization of ARR is transferred to the holding circuit by contacts 1—2, which are designed to close before contacts 2—3 open, and ARR remains energized until SCC opens. In this way the open circuits at contacts 4—5 and 6—7 of ARR prevent the repeat operation of the punch that would otherwise occur if contacts 1—2 of PLC should close before SCC had opened. PCC is designed to open well before PLC contacts 1—2 close in the punch cycle.

For preparation of the second or final tape CS is placed in its Comp. position as shown in the drawing, the previously prepared first tape is placed in the tape reader 3, the second tape is placed in the tape punch 2 and the Punch On switch must be in its actuated position. Keyboard lock magnet KLM is energized as before through contacts 4—5 of CCR and PTC. Next the Start Read switch is depressed and held down manually. This energizes reader control relay RCR through a circuit extending from (+) through PTC, RTC, Start Read, contacts 3—2 of RCR, and coil of RCR to (−). RCR holds through a circuit extending from (+) through PTC, RTC, Stop Read, and contacts 1—2 of RCR. Closure of the Start Read switch also energizes relay DR for as long as the switch is held closed. Actuation of DR causes a positive voltage to be applied through contacts 1—2 of DR and CS10 to input terminal A of a check circuit which may be traced through contacts 4—5 of holding relay HR1, contacts 1—2 of SC1, contacts 4—5 of HR2, contacts 1—2 of SC2, etc. to output terminal B, and thence through the coil of no-error relay NER and CS11 to (−), thus energizing NER. Actuation of NER causes + voltage to be applied from terminal 3 of Punch On through contacts 4—5 of Tape 1 Error, contacts 2—1 of NER, contacts 2—1 of ARR, contacts 5—4 of RCR, and thence through reader clutch magnet RCM to (−) thus energizing RCM and starting operation of the reader. As long as Start Read is depressed RCM is held in an energized state and the reader continues to operate until the first code group of the first tape is read. Sensing of the first code group, which occurs shortly after the start of a reader cycle, causes one or more of reader contacts RC1–RC5 to close energizing one or more of the corresponding holding relays HR1–HR5. The holding relays are energized from + voltage on conductor 4 which is connected to the + terminal of the power supply through RTC and PTC. Actuation of one or more of the holding relays breaks the continuity of check circuit A—B and, since RCC is open at this time, deenergizes NER which in turn deenergizes RCM through the opening of its contacts 1—2 and causes the reader to stop at the end of its cycle. At the end of the cycle the tape will have been indexed to bring the second code group into reading position, however, the feeler pins will not sense this group until the start of the next cycle. Those of the holding relays that were actuated by the first code group are held energized through circuits extending through contacts 1—2 of the holding relays and the RCM contact to + voltage at contact 5 of Tape 1 Error. Since RCM is deenergized immediately upon energization of a holding relay the RCM contacts are closed prior to the opening of the reader contacts, thus preventing release of the holding relays when the reader contacts open. When the reader stops after having sensed the first code group as described above, the Start Read switch is released deenergizing relay DR.

After the reader has stopped and the Start Read switch has been released, the second operator, reading from the original manuscript, depresses the key corresponding to the first character of the manuscript. If the resulting code produced by the selector switches corresponds to the first code group of the first tape, now stored in the holding relays, the continuity of check circuit A—B is reestablished. This causes the punch to be actuated, perforating the second tape with the code corresponding to the depressed key, and initiates the second cycle of the reader through energization of no-error relay NER.

This process may be described in more detail by assuming the first code group of the first tape to represent, for example, the numeral 3. In this case holding relays HR4 and HR5 are energized breaking the check circuit A—B at contacts 4—5 of these relays. When key 3 is depressed contacts SC4 and SC5 are actuated reestablishing the continuity of the check circuit at contacts 2—3 of these switches. Selector common contact SCC, which is actuated when any key is depressed, also closes. The code contacts SC1–SC5, as already mentioned, are designed to close before SCC, therefore, when SCC closes + voltage is established on terminals 14 and 15 of punch relay PR from terminal 1 of PLC through SCC, terminal A of the check circuit, through the check circuit to terminals 3 of SC4 and SC5, and thence to terminals 14 and 15 of PR. Closure of SCC also energizes PR through a circuit extending from + voltage at contact 1 of PLC through SCC, check circuit A—B, contacts 6—5 of DR, contacts 2—1 of CS12, contacts 6—7 of ARR, contacts 2—9 of PR and thence through the coil of PR to (−). Energization of PR applies voltage from its terminals 14 and 15 to punch magnets PM4 and PM5. Energization of PR also energizes PCM through contacts 3—10 and initiates a cycle of punch operation which results in perforations of the second tape in accordance with the 3 code. PR holds through its contacts 9—1 and contacts 1—2 of CS30 until released by the opening of contacts 1—2 of PLC shortly after the start of the punch cycle. PCC, which was closed when PM4 and PM5 were energized, acts to insure operation of the punch by keeping voltage on PCM until contacts 1—2 of PLC open, as already explained in connection with the preparation of the first tape.

The voltage appearing at terminal B of the check circuit when SCC closes also energizes no-error relay NER which holds through a circuit extending from + at terminal 2 of the Punch On switch through RTC, RCC and terminals 5—4 of NER to the coil of NER. Actuation of NER causes + voltage at terminal 5 of Tape 1 Error to be applied through terminals 2—1 of NER, terminals 2—1 of ARR and terminals 5—4 of RCR to RCM, thus energizing the reader clutch magnet and initiating the second cycle of operation of the reader. Since the RCM contacts are in the holding circuit of the holding relays, energization of RCM breaks this holding circuit and deenergizes those relays which were energized by the preceding code group, in this case HR4 and HR5, thus conditioning the holding relays to receive the next code group when the tape is sensed by the feeler pins. Prior to this time in the reader cycle, however, RCC opens deenergizing NER which in turn deenergizes RCM, closing its contacts and restoring the holding circuit for HR1–HR5, which permits the next code to be stored by these relays. The reader stops again at the end of its cycle with the first tape in position for the third code group to be sensed.

The antirepeat arrangement is somewhat different during the comparator phase of operation than that previously described in connection with the preparation of the first tape. When switch CS was in its Normal position, ARR was held by a circuit extending from + voltage at terminal 1 of PLC through SCC, terminals 3—1 of CS12 and contacts 4—3 of ARR to the coil of ARR, so that ARR remained energized until SCC opened. With switch CS in its Comp. position, however, there are two holding circuits for ARR: one extending from + voltage at terminal 1 of PLC through SCC, check circuit A—B, contacts 6—5 of DR, contacts 2—1 of CS—12, and contacts 4—3 of ARR to the coil of ARR, and the other extending from + voltage at RTC through RCC, contacts 5—4 of NER and thence by way of the same path as the first holding circuit to the coil of ARR. Therefore, even though contacts 2—3 of PLC open, ARR will not release unless RCC and SCC or the check circuit open. This prevents a repeat operation of the punch that otherwise would occur if contacts 1—2 of PLC closed before SCC or the check circuit opened, or if ARR should be permitted to release before the opening of RCC and consequent removal of voltage from contact 6 of ARR. Also, by placing contacts 1—2 of ARR in series with the energizing circuit of RCM, a reenergization of RCM is prevented that would otherwise occur in the situation where NER, having been previously released by RCC, is reenergized by closure of contacts 1—2 of PLC with SCC and the check circuit A—B closed.

The foregoing deals with the situation in which the code produced by the selector contacts actuated by the depressed key agrees with the code stored in the holding relays. If these codes do not agree either the second operator has depressed the wrong key or the code group perforated in the first tape is in error. When the codes disagree continuity is not established in the check circuit A—B and as a result PCM, NER and RCM are not energized. However, the closure of SCC applies + voltage from contact 1 of PLC through SCC contacts 3—4 of DR, contacts 3—2 of check control relay CCR, Error Reset, coil of CCR and CS11 to (−) thus energizing CCR which holds from + voltage at contact 5 of Tape 1 Error through contacts 2—3 of NER, contacts 1—2 of CCR, Error Reset, coil of CCR and CS11 to (−). Actuation of CCR deenergizes KLM at contacts 4—5 and locks the keyboard preventing further operation until the error is found. Although CCR is actuated each time SCC closes regardless of whether continuity of the check circuit is established, if there is no error and continuity is established, NER is energized and the holding circuit of CCR broken at contacts 4—5 so that only a momentary deenergization of KLM occurs.

In order to determine if the error was made by the second operator depressing the wrong key, the Error Reset switch is momentarily depressed. This breaks the holding circuit of CCR and releases the keyboard for a second try. If, after making certain that the correct key is depressed, the keyboard again locks, the error must be in the first tape. In order to perforate the second tape with the correct code group, the Tape 1 Error switch is depressed and held manually. The opening of contacts 4—5 of this switch breaks the holding circuit of CCR, allowing contacts 4—5 of CCR to close and reenergize KLM, and also breaks the holding circuit of relays HR1–HR5 clearing these relays. The closing of contacts 3—4 of Tape 1 Error energizes override relay OR connecting terminals 2 of SC1–SC5 together. The closing of contacts 1—2 of Tape 1 Error completes a circuit from + voltage at contact 1 of PLC through SCC, contacts 3—4 of DR, contacts 3—2 of CCR, and contacts 2—1 of Tape 1 Error to terminal B of the check circuit. With the Tape 1 Error switch held in its actuated position, the correct key is now depressed. Depression of the key first closes the associated selector contacts and then closes SCC which causes + voltage to be applied to terminal B over the above described circuit. The voltage at B acts through the actuated selector switches and PR when energized to energize the corresponding punch magnets, and through contacts 6—5 of DR, contacts 2—1 of CS12 and contacts 6—7 of ARR to energize PR and PCM, causing the punch to perforate the second tape with the correct code. The voltage at B also energizes NER which holds through its contacts 4—5 and RCC.

As already explained, punch lock contact PLC is actuated early in the punch cycle. This energizes ARR, breaking the PCM energizing circuit at contacts 6—7 and the RCM energizing circuit at contacts 1—2. After its initial energization ARR is held energized by a circuit extending from + voltage at contact 2 of RTC through RCC, contacts 5—4 of NER, contacts 6—5 of DR, contacts 2—1 of CS12 and contacts 4—3 of ARR to the coil of ARR. When Tape 1 Error is released + voltage is applied from its contact 5 through contacts 2—1 of NER to contact 2 of ARR but does not get through to RCM since ARR is held energized through the above described circuit. In order to continue the preparation of the second tape Start Read is momentarily depressed. This momentarily energizes DR opening its contacts 5—6 and breaking the holding circuit of ARR. The release of ARR allows its contacts 1—2 to close energizing RCM and initiating the next reader cycle. At the time Start Read is actuated, HR1–HR5 are still deenergized as a result of the prior actuation of Tape 1 Error and selector contacts CS1–CS5 are in their normal positions so that continuity exists in the check circuit A—B. As a result DR is held energized through a circuit extending from + voltage at contact 2 of RTC through RCC, contacts 5—4 of NER, check circuit from B to A, CS10 and terminals 2—1 of DR to the coil of DR. The purpose of this is to prevent the energization of PCM that would occur if contacts 5—6 of DR should reclose prior to removal of the + voltage at contact 6 by the opening of RCC. Since the check circuit is a part of the DR holding circuit, RCC is designed to open before reader contacts RC1–RC5 close, for otherwise actuation of one or more of the holding relays would break the continuity of the check circuit and cause a premature release of DR. Early in the reader cycle RCC opens, releasing NER and DR, and reader contacts RC1–RC5 are actuated in accordance with the code group then in reading position energizing the corresponding holding relays which store this code for comparison with the next operation of the keyboard.

It may be desirable, for example when recording decimal numbers in binary code, to represent zero (0) on the tape by the absence of perforations rather than by the five perforations shown in Fig. 2. In this case the keyboard is designed so that depression of the 0 key actuates SCC but none of the selector contacts SC1–SC5. Since in the punch shown in Fig. 1, PCC is actuated when one or more of the punch magnets PM1–PM5 are energized, it follows that PCC would not be actuated for zero with this coding. This stiuation may be remedied by modifying PCC so that it is actuated whenever PCM is energized as shown in Fig. 3. With this arrangement PCC is normally latched open and is released to a closed condition whenever voltage is applied to PCM, thus insuring actuation of PCC for zero as well as all other characters of the keyboard. PCC may be returned to its latched open condition when the punch actuating mechanisms are returned to their latched inoperative conditions as previously explained in connection with the punch 2 of Fig. 1. Also the above zero code prohibits the use of zero as the first recorded code group, since it would not break the continuity of check circuit A—B as required to release NER and deenergize RCM for stopping the reader. However, this problem does not arise in the recording of numbers since it is the usual practice to precede each number word with its sign (+ or —).

We claim:

1. A tape comparator comprising a keyboard having a coded electrical output, a tape punch actuatable by said coded output for preparing a verified tape, a tape reader having a coded electrical output for reading an initially prepared tape, means for comparing the output code of said keyboard with the output code of said reader, means operative when said compared codes agree to actuate said punch in accordance with the coded output of said keyboard, and means operative when said compared codes disagree to indicate said disagreement.

2. A tape comparator comprising a keyboard having a coded electrical output, a tape punch actuatable by said coded output for preparing a verified tape, a tape reader having a coded electrical output for reading an initially prepared tape, means for comparing the output code of said keyboard with the output code of said reader, means operative when said compared codes agree to actuate said punch in accordance with the coded output of said keyboard, and means operative when said compared codes disagree to lock said keyboard.

3. A tape comparator comprising a keyboard having a coded electrical output, a tape punch actuatable by said coded electrical output for preparing a verified tape, a tape reader having a coded electrical output for reading an initially prepared tape, means for operating said punch one cycle at a time, means for operating said reader one cycle at a time, means for comparing the output code of said keyboard with the output code of said reader, means operative when said codes agree for applying the coded output of said keyboard to said punch and for actuating said punch and reader operating means, means operative when said codes disagree to indicate the disagreement, and manually operable means to override said comparing means for applying the coded output of said keyboard to said punch and for actuating said punch operating means regardless of the coded output of said reader.

4. Apparatus as claimed in claim 3 in which there are provided means operable after said manually operable means has returned to normal for actuating said reader operating means independently of said punch operating means.

5. Apparatus as claimed in claim 3 in which said indicating means comprises means for locking said keyboard, and in which means are provided for releasing said locking means without disturbing said code comparing means.

6. A tape comparator comprising a keyboard having a coded electrical output, a tape punch actuatable by said coded electrical output for preparing a verified tape, a tape reader having a coded electrical output for reading an initially prepared tape, means for operating said punch one cycle at a time, means for operating said reader one cycle at a time, means comprising a check circuit having input and output terminals for comparing the output code of said keyboard with the output code of said reader, said comparing means operating when said codes agree to establish electrical continuity in said check circuit, means operated by actuation of a key to apply a pulse of voltage to the input terminal of said check circuit, means responsive to said voltage at said input terminal to lock said keyboard, said last named means having holding means for maintaining the locked condition of said keyboard beyond the duration of the voltage at said input terminal, means responsive to a voltage pulse at the output terminal of said check circuit for disabling said holding means, means responsive to a voltage pulse at said output terminal for applying the coded output of said keyboard to said punch and for actuating said punch and reader operating means, and manually operable means for use when no voltage occurs at said output terminal for disabling said holding means and for overriding said comparing means to apply the coded output of said keyboard to said punch and to actuate said punch operating means.

7. Apparatus as claimed in claim 6 in which means associated with said reader are provided for operating, when voltage appears on said output terminal, to maintain said voltage until a predetermined instant between the start of the next ensuing cycle of said reader and the occurrence of its output.

8. Apparatus as claimed in claim 7 in which antirepeat means operative shortly after the start of the punch cycle are provided for preventing actuation of said punch operating means and said reader operating means until the voltage at said output terminal is zero.

9. Apparatus as claimed in claim 8 in which manually operable means are provided for releasing said antirepeat means in the presence of voltage on said output terminal.

10. Apparatus for comparing two binary numbers of $n$ or less places in which electrical continuity is established between two terminals when said numbers are the same, said apparatus comprising: two groups of $n$ switches each, each of said switches corresponding to one of said $n$ places and each having a first contact corresponding to the binary coefficient 1, a second contact corresponding to the binary coefficient 0 and a third contact for making an electrical connection to either of said first and second contacts; means connecting the first and second contacts of the switches in one group to the first and second contacts, respectively, of the corresponding switches in the other group; means connecting one of said terminals to the third contact of the switch corresponding to the highest ordered binary place in one group; means connecting the other of said terminals to the third contact of the switch corresponding to the lowest ordered binary place in the other group; starting with the switch corresponding to the highest ordered binary place in said other group, means for connecting the third terminal of each switch in said other group, save that switch corresponding to the lowest ordered place, to the third terminal of the switch in said one group corresponding to the next lower ordered binary place; means for setting the third contacts of the switches in one of said groups to correspond to one of said binary numbers; and means for setting the third contacts of the switches in the other of said groups to correspond to the other binary number.

References Cited in the file of this patent

UNITED STATES PATENTS

| | | |
|---|---|---|
| 1,976,615 | Jones | Oct. 9, 1934 |
| 2,074,392 | Herbert | Mar. 23, 1937 |
| 2,155,825 | Haselton | Apr. 25, 1939 |
| 2,679,034 | Albrighton | May 18, 1954 |
| 2,700,755 | Burkhart | Jan. 25, 1955 |